United States Patent [19]

Belke

[11] 4,025,677
[45] May 24, 1977

[54] TEMPORARY PATCH FOR A CRACK IN THE WALL OF A CONTAINER

[75] Inventor: Ralph E. Belke, Oak Park, Ill.

[73] Assignee: Belke Manufacturing Company, Inc., Chicago, Ill.

[22] Filed: Dec. 8, 1975

[21] Appl. No.: 638,508

[52] U.S. Cl. .................................... 428/63; 428/81; 156/94; 29/401 E; 204/16; 277/2; 277/72 FM; 429/49

[51] Int. Cl.² ...................... B32B 3/26; B32B 3/02; B65D 53/00; E21B 15/00

[58] Field of Search ............... 156/94; 428/63, 81; 204/16; 29/401 E; 136/174; 277/2, 9.5, 11, 72 FM

[56] References Cited

UNITED STATES PATENTS

| | | | |
|---|---|---|---|
| 2,068,035 | 1/1937 | Meyer | 277/11 X |
| 2,093,129 | 9/1937 | Johnston | 277/9.5 |
| 3,198,323 | 8/1965 | Alberti et al. | 277/11 |
| 3,470,787 | 10/1969 | Mackie | 277/2 X |
| 3,837,965 | 9/1974 | Mahon et al. | 156/94 X |

*Primary Examiner*—Philip Dier
*Attorney, Agent, or Firm*—John J. Kowalik

[57] ABSTRACT

A quick patch for a tank comprising a suction cup. The cup is partially filled between its dome or center portion and rim with mastic. A quick setting adhesive is applied to a cleaned surface on the interior tank wall about the crack. The vacuum cup is applied over the crack and the dome portion depressed while the rim is tightly engaged with the surface. The interior of the depressed center portion is pressed against the adhesive and quick-glued in place while the interior is evacuated. In the event that the adhesive fails to hold after a while, the center portion will expand causing the peripheral edge portions of the vacuum cup to adhere to the wall surface of the tank and drawing in the encompassing mastic. In the exterior application the expansion of the center portion serves as an indicia of the failure of the patch.

10 Claims, 5 Drawing Figures

U.S. Patent
May 24, 1977
4,025,677
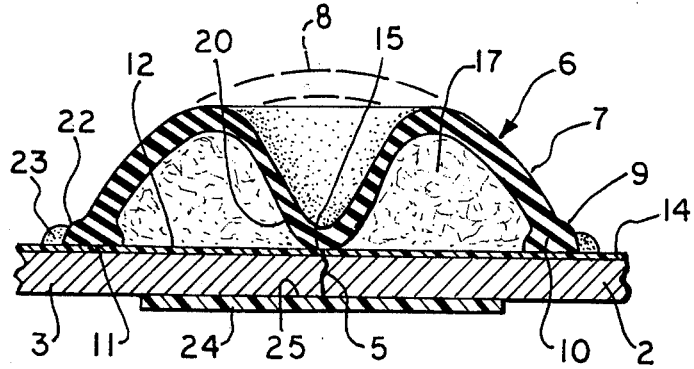
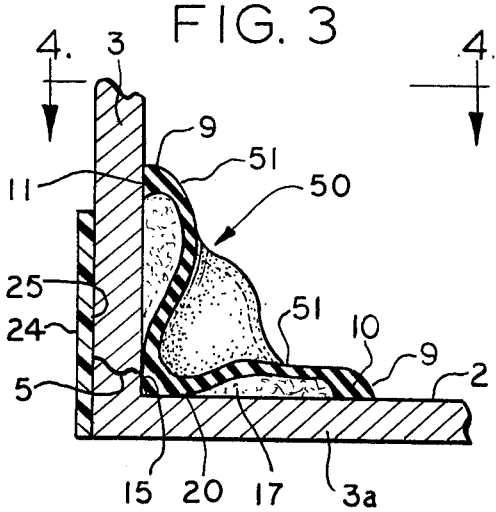
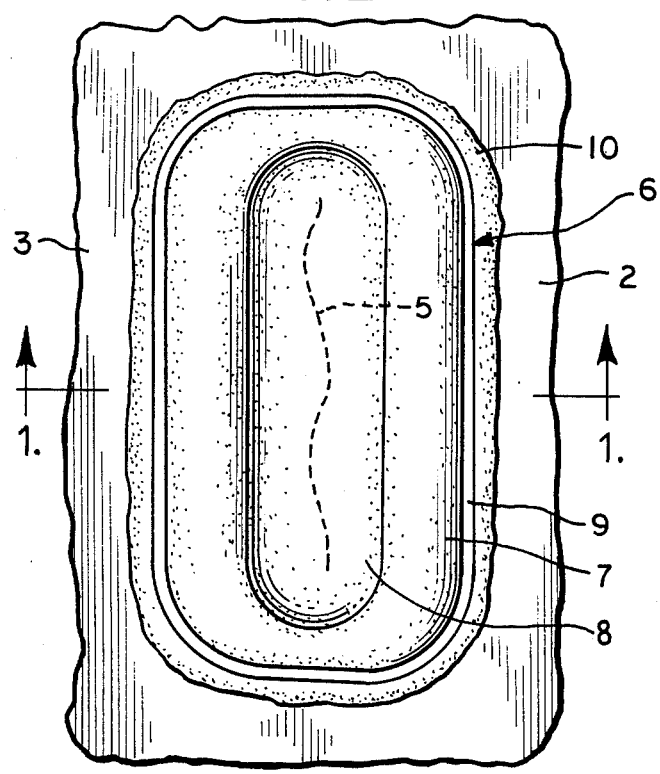
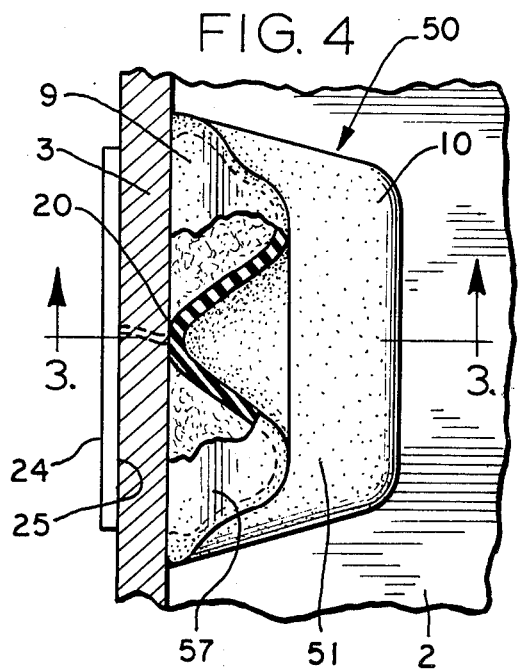
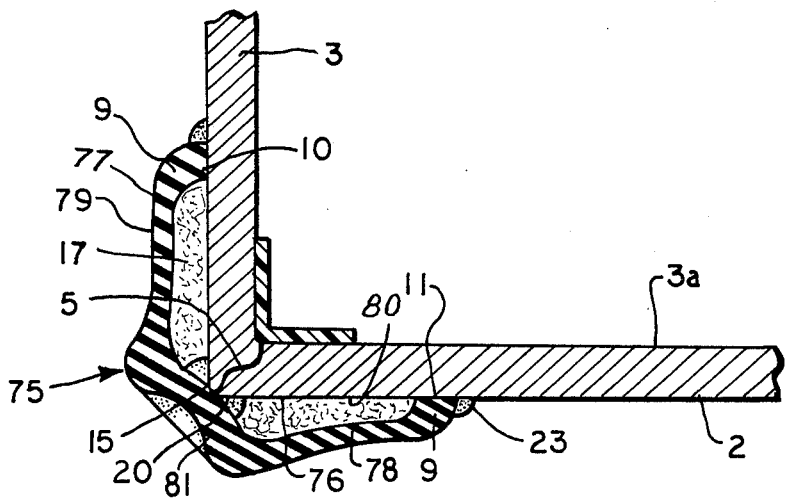

TEMPORARY PATCH FOR A CRACK IN THE WALL OF A CONTAINER

Discussion and Summary of the Invention

In the art of electroplating, there are many occurrences of tank leakage. During a production run after the bath is prepared it is generally necessary to empty the tank and then suitably repair the metallic portion by welding or brazing. This heats an extensive area of the tank and deteriorates the plastisol lining of the interior. All of this deteriorated material has to be removed, the surface prepared and new compound applied, which then must cure. All of this is intensively time consuming.

A general object of the invention is to provide a novel cold patch which can be quickly and effectively applied.

A more specific object is to provide a novel patch which comprises a vacuum cup made of suitable material such as neoprene or plastic which may be applied against the surface to be repaired, the cup being depressed to effect subatmospheric pressure within the cup effective to draw sealing mastic thereagainst upon failure of the primary seal which is effected between the interior of the cup and the surface to be patched by a primary adhesive used to adhere the center portion while in stressed condition to said surface about the break in the wall.

These and other objects and advantages inherent in and encompassed by the invention will become more apparent from the specifications and the drawings wherein:

FIG. 1 is a transverse sectional view of the patch applied to a wall taken substantially on line 1—1 of FIG. 2;

FIG. 2 is a side elevational view of the invention;

FIG. 3 is a cross-section of an embodiment of the invention shown applied to a corner of a tank taken substantially on line 3—3 of FIG. 4;

FIG. 4 is an elevational view taken essentially on line 4—4 of FIG. 3; and

FIG. 5 is a cross-sectional view of another embodiment of the invention applied to the exterior corner of a tank.

Description of FIGS. 1 and 2

Describing the invention in detail, there is shown a portion of a tank 2 comprising a wall 3 having a break or crack 5 therein.

The break or fracture 5 is sealed by the temporary patch generally designated 6 which comprises a vacuum cup 7 made of any suitable elastomer material such as neoprene, rubber or suitable flexible plastic material which will not be affected by the electrolyte solution in the tank.

The cup 7 has a flexible center or dome portion 8 and a more rigid edge portion 9 which may include a relatively thick rim 10 providing a flat gripping face 11 which is adapted to engage the interior surface 12 of the tank wall 3. This surface may have a suitable plastisol covering 14. This coating may be suitably stripped or cleaned or if the tank is uncoated the interior surface is cleaned.

A quick setting cement or adhesive 15 such as epoxy resins, ethylene-acrylic acid copolymers or carboxylated polypropylene, or any other quick setting suitable adhesive such as alpha cyanoacrylate such as sold by the Oneida Electronic Manufacturing Company, Inc., of Meadville, Pa., is applied about the crack 5 on the interior surface of the tank wall. The cup, which is partially filled with a mastic or slow setting compound 17 having a preferably neoprene base or the like, is applied against the interior surface by abutting the face 11 against the surface 12. Thereafter the center flexible portion 8 is depressed to evacuate the cup. The interior 20 of the center portion is adhered to the adhesive 15. If desired, the periphery 22 of the edge rim or 11 may be coated with an adhesive band 23 of the same compund as designated 17 which is applied also to surface 12. In operation, normally the adhesive will hold the center portion of the vacuum cup sealed about the crack. However, if this should not hold for some reason, then the center portion will begin to expand. In such instance, the mastic within the cup flows inwardly since the plastic patch 24, which is adhered by adhesive 25 to the external side of the tank wall covering the crack, will prevent air from being drawn in. Also, the band of mastic 23 may be drawn about the periphery of the cup.

Description of FIGS. 3 and 4

The embodiment of FIGS. 3 and 4 parts identical with the previous embodiment will be identified with the same reference numerals. In this modification a corner patch 50 or vacuum cup is provided and comprises a pair of flange portions 51,51 arranged at right angles to each other. The peripheral edging or rim 10 is rectangular and the central dome portion is oval shaped like in the previous embodiment. Of course, the dome may be spherical and the rim annular in the embodiment of FIGS. 1 and 2 depending upon size of the fracture. The same procedure is used to apply this patch as the previous one; that is, after the interior tank surface is cleaned, and the exterior patch 24 adhered with adhesive 25, the interior patch 50 is applied to the fractured area. The dome section is depressed until the interior thereof imbeds into the adhesive 15 and is held until the adhesive sets. Then mastic within the dome displaces about the depressed dome and further seals the area. The flange areas oppose and engage respective walls 3,3a of the tank.

Embodiment of FIG. 5

The embodiment of FIG. 5 is similar to that shown in the previous arrangements and therefore like parts are identified by corresponding reference numerals. In this modification the patch 75 is applied to an outside corner 76 and has corner embracing wing or side portions or sections 77,78 opposing the cleaned exterior sides 79,80 of walls 3,3a. The patch is made of the same materials as the previous two embodiments and has a central elongated bubble or center dome portion 81 which after the wing or flange portions 77,78 are applied is depressed to imbed the interior of the portion 81 into the adhesive 15. The interior of the corner is cleaned in the break area 5 and a plastic or other suitable material is adhered by suitable adhesives to such corner. In this embodiment, since the patch is external, its integrity is easily monitored by observing the position of the center bubble or dome 81. If it is depressed, then the seal is holding; if it expands, then there is undoubtedly a leak and before filling the tank, the patch will have to be reapplied to properly seal.

Various embodiments of the invention have been disclosed . However, it will be readily apparent that various other forms of the invention will become readily apparent to those skilled in the art which fall within the scope of the appended claims.

I claim:

1. A temporary patch for a crack in the wall of a container comprising a suction cup of elastomeric resilient material having a shape-recovering distortable dome portion and a peripheral wall-engaging portion, said dome portion being flexible and adapted upon application of said peripheral portion against the wall to be pressed against said wall in the vicinity of the crack to evacuate air from the interior of the dome; an adhesive bonding said dome in its depressed state to said wall in covering relation to the crack, said dome comprising means for expanding said dome upon failure of said adhesive to bond the same to the wall thereby providing an indication that said patch is not bonded to said wall 2. The invention according to claim 1 and said adhesive being alpha cyanoacrylate.

3. The invention according to calim 1 and including a slow setting compound within the dome.

4. The invention according to claim 1 and said cup comprising angularly related corner-embracing sections for application about a corner of a container.

5. The invention according to claim 1 and said adhesive being quick-setting.

6. The invention according to claim 5 and said material being neoprene.

7. The invention according to claim 1 and said cup being at least partially filled with a mastic material.

8. The invention according to claim 1 and an additional patch of material bonded to the container on the crack on a side opposite to said suction cup.

9. The invention according to claim 1 and said suction cup being of elongated generally rectangular shape.

10. The invention according to calim 1 and said suction cup having a pair of angularly related corner-embracing flange portions, and said dome portion bridging said flange portions.

* * * * *